United States Patent Office 3,404,160
Patented Oct. 1, 1968

3,404,160
BIS HETERO CYANOACRYLATES
Albert F. Strobel, Delmar, and Sigmund C. Catino, Castleton, N.Y., assignors to GAF Corporation, a corporation of Delaware
No Drawing. Continuation-in-part of application Ser. No. 244,023, Dec. 12, 1962. This application Dec. 15, 1966, Ser. No. 601,853
18 Claims. (Cl. 260—332.2)

ABSTRACT OF THE DISCLOSURE

Substantially colorless compounds which exhibit a prominent absorption peak between 2500 A. and 4000 A. and which are outstanding absorbents for ultra-violet radiation and excellent stabilizers for organic materials to protect them against the degradative effects of such radiation, are characterized as bis (monocyclic heterocyclic) α cyanoacrylates, said heterocycles being of the group containing 5 and 6 members in the ring and wherein the hetero atom is at least one of the group of oxygen, nitrogen and sulfur, and also including dimer forms of such compounds linked with a bivalent bridging radical.

---

This application is a continuation in part of application Ser. No. 244,033, filed Dec. 12, 1962 and now abandoned.

This invention relates to new and useful compounds which impart to organic materials superior resistance to degradation and deterioration when they are exposed to actinic radiation, and in particular to ultraviolet radiation. This invention further relates to processes for the preparation of new and useful compounds of the type hereinbefore described. The compounds with which this invention is concerned are characterized as bis hetero cyanoacrylates.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations are are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultraviolet range. Such uses include incorporation in plastic sheet materials and the stablization in general of transparent plastic bodies. By far, the greatest concern with respect to ultraviolet radiations is with those radiations which come from the sun. Most of these radiations have wave lengths between 250 and 400 millimicrons. The effects of such radiation on the human skin, producing sunburn and suntan are, of course, well known. Other effects, however, of great commercial importance, relate to the photochemical degradation caused by ultraviolet radiation. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods, will spoil and turn rancid on exposure to ultraviolet light. It is well known that colored objects such as dyed textiles will fade on exposure to sunlight, and in particular to ultraviolet light. Many plastics, in addition to developing color formation and reduction in transparency, become brittle, lose their elasticity, crack, and eventually completely deteriorate on exposure to sunlight. Paints, varnishes, lacquers, and the like, also are prone to these effects even though here the transparency property may not be paramount.

We have discovered that by combining bis hetero cyanoacrylates with organic materials, there results compatible combinations with a vast number of film-forming plastics, resins, gums, waxes and the like, which combinations further exhibit outstanding ultraviolet absorbing properties within the generally encountered ultraviolet region of 250 to 400 millimicrons. The compounds with which this invention is concerned, even though they exhibit oustanding absorbing properties close to the visible region of the electro magnetic field, nevertheless are essentially colorless compounds and can be employed with the assurance that they will not contribute to color in normally colorless formulations, nor will they affect the color of a colored formulation such as a paint film, or a dyed textile. Many of the compounds of this invention will absorb some visible light on the violet and of the spectrum, which renders them particularly useful in many formulations which are susceptible to visible light degradation. Thus, polyesters and polyethylenes are known to be so characterized, and the stabilization of these materials is extremely successful when using the compounds herein contemplated.

The compounds of this invention, additionally are outstanding in that they do not require a phenolic hydroxyl group in order to achieve light stability. The heretofore used hydroxybenzophenone absorbers must have such a grouping. The presenec of an hydroxyl which is capable of salt formation renders these absorbers unsuitable for use in alkaline media and particularly in alkaline plastic materials such as epoxys, melamines and the like. While the compounds of the present invention do not require an hydroxyl group, the presence thereof is not disadvantageous, or a detriment where alkaline sensitivity is no problem.

It is therefore an object of the present invention to provide new and useful compounds characterized by outstanding ultraviolet absorbing properties.

It is still another object of this invention to provide new and useful bis hetero cyanoacrylates which are outstanding ultraviolet absorbing compounds.

It is a still further object of the present invention to provide processes for the preparation of new and useful ultraviolet absorbing compounds.

It is still a further object of the present invention to provide processes for the preparation of new and useful ultraviolet absorbing compounds which are characterized as bis hetero cyanoacrylates.

Other objects will appear hereinafter as the description proceeds.

The bis hetero cyanoacrylates which are contemplated in this invention exhibit a prominent peak or peaks between 250 A. and 400 A. and are devoid of nitro groups and nuclear bonded amino groups and have the following general formula:

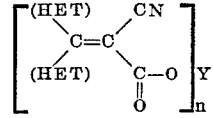

wherein each (HET) represents independently a 5- or 6- membered heterocyclic nucleus or a benzo (5- or 6-membered) heterocyclic nucleus containing at least one pair of conjugated double bonds, and wherein the hetero atoms are oxygen, nitrogen and/or sulfur and $n$ is an integer from 1 to 2, and Y is a radical selected from the group consisting of alkenyl ($C_3$ to $C_{25}$), aryl, hetero (i.e., HET) and substituted derivatives thereof, e.g., halophenyl, halonaphthyl alkoxyphenyl, alkoxynaphthyl, alkylphenyl, halothienyl, alkylthienyl alkylfuryl, phenylfuryl, alkoxyfuryl, alkoxypyrridyl, halopyrryl, etc., when $n=1$; and when $n=2$, Y is a bivalent bridging radical such as alkylene, arylene, hetero (i.e., HET) and substituted derivatives thereof.

Examples of suitable heterocycles are: thiophene, furane, pyrrole, α-pyran, α-pyrone, pyridine, 1,2-dihydropyridine, oxazole, thiazole, isoxazole, isothiazole, pyrazole, 3-isopyrazole, imidazole, 2-isoimidazole, 1,2,3-triazole, 1,2,4-triazole, tetrazole, 1,3,4-oxadiazole, 1,2,5-oxadiazole, 1,2,3-thiadiazole, 1,2,3-oxathiazole, pyridazine, pyrimidine, pyrazine, 1,3,5-triazine, and fused ring systems of benzene nuclei and naphthalene nuclei with the aforementioned heterocyclics, e.g., benzothiophene, benzofurane, quinoline, phthalazine, benzimidazole, 1,2,3-benztriazole, benzoxazole.

The hetero nuclei may contain alkyl, substituted alkyl, halogen, acyl, sulfonyl, carboxamido, oxy and similar inert substituents which may vary the ultraviolet absorption spectrum but which do not affect the function and stability of the compounds. Such substituents include: alkyl, methyl, ethyl, n-propyl, iso-propyl, n-butyl, isobutyl, tertiary-butyl, secondary-butyl, n-amyl, iso-amyl, tertiary-amyl and the other isomeric amyls, n-hexyl, iso-hexyl and the other isomeric hexyls, n-heptyl, iso-heptyl and the other isomeric heptyls, n-primary nonyl (nonyl-1), nonyl-(2), nonyl-(3), nonyl-(5), 2-methyl-octyl-2, 4-ethyl-heptyl-4, 2-methyl-4-ethyl-hexyl-4, n-primaryl octyl, octyl-(2) (capryl), 2-methyl-3-ethyl-pentyl-3, 2,2-4-trimethyl-pentyl-4, 2-ethyl-hexyl-1, 3-ethyl-hexyl-3, 2-methyl-heptyl-2, 3-methyl-heptyl-3, 4-methyl-heptyl-4, n-primary decyl (decyl-1), decyl-4 (secondary decyl), 2-ethyl-octyl-3 (tertiary decyl), 4-propyl-heptyl-4 (tertiary decyl), undecyl-1 (n-primary decyl), undecyl-2 (n-secondary decyl), dodecyl-1 (n-dodecyl), tridecyl-1 (n-tridecyl), tridecyl-7, 3-decyl-undecyl, tetradecyl-1 (n-tetradecyl), pentadecyl-1 (n-pentadecyl), pentadecyl-8, hexadecyl (cotyl), heptadecyl-9, octadecyl-1, 2-methyl heptadecyl-2, eicosyl-1, docosyl-1, tricosyl-12, tetracosyl, tricapryl, pentacosyl, hexacosyl, heptacosyl, octacosyl, nonacosyl, myrisyl (30 carbons).

Alkenyl: allyl ($CH_2=CHCH_2-$), methallyl ($CH_2=C(CH_3)CH_2-$)

crotyl ($CH_3CH=CHCH_2-$), butenyl-1

($CH_2=CH-CH-CH_3$)

pentenyl-1, γ-isopropyl allyl, β-ethyl-3-propyl allyl, 2-methyl-octenyl-6, decenyl-1, decenyl-2, undecenyl, dodecenyl-2, octadecenyl, docosenyl pentamethyl eicosenyl.

Substituted alkyl: cyanoethyl, cyano-n-propyl, cyanoisopropyl, cyano-n-butyl, cyano-isobutyl, cyano-n-amyl, cyano-isoamyl, cyanohexyl, cyanoheptyl, cyano-n-octyl, cyano-nonyl, cyanodecyl, cyanolauryl, cyanostearyl and the like, hydroxyethyl, hydroxy-n-propyl, hydroxy-isopropyl, hydroxy-n-butyl, hydroxy-isobutyl, hydroxy-n-amyl, hydroxy-isoamyl, hydroxy-hexyl, hydroxy-heptyl, hydroxy-nonyl, hydroxy-decyl, hydroxy-lauryl, hydroxystearyl and the like, carbomethoxyethyl, carbomethoxypropyl, carbomethoxybutyl, carbomethoxyamyl, carbomethoxyhexyl, carbethoxyethyl, carbethoxypropyl, carbethoxybutyl, etc., carbopropoxyethyl, carbopropoxypropyl, carbopropoxybutyl, etc., carbobutoxyethyl, carbobutoxybutyl, etc., chloroethyl, chloropropyl (N-propyl, isopropyl), chlorobutyl (N-butyl, isobutyl, etc.), chloroamyl, chlorohexyl, chlorodecyl, chlorolauryl, and the like, bromoethyl, bromopropyl (N-propyl, isopropyl), bromobutyl (N-butyl, isobutyl, etc.), bromoamyl, bromohexyl, bromodecyl, bromolauryl, and the like, methoxyethyl, methoxypropyl (N-propyl, isopropyl), methoxybutyl (N-butyl, isobutyl, etc.), methoxyamyl, methoxyhexyl, methoxydecyl, methoxylauryl, and the like, ethoxyethyl, ethoxypropyl (N-propyl, isopropyl), ethoxybutyl (N-butyl, isobutyl, etc.), ethoxyamyl, ethoxyhexyl, ethoxydecyl, ethoxylauryl, and the like, hydroxyethoxyethyl, hydroxyethoxypropyl, hydroxyethoxybutyl, hydroxyethoxyamyl, hydroxypropoxyethyl, hydroxypropoxypropyl, hydroxypropoxybutyl, hydroxypropoxyamyl, hydroxybutoxyethyl, hydroxybutoxypropyl, hydroxybutoxybutyl, hydroxybutoxyamyl.

Halogen: fluorine, chlorine, bromine, iodine.

Acyl: acetyl, propionyl, butanoyl, amoyl, etc., benzoyl, toluoyl, naphthoyl, etc.

Sulfonyl: $CH_3SO_2$, benzene sulfonyl, toluene sulfonyl, etc.

Oxy: hydroxy, methoxy, ethoxy, hydroxyethoxy, etc.

Carboxamido ($-CONH_2$), N-methyl carboxamido ($CONHCH_2$), N-ethyl carboxamido, N-dimethyl carboxamido, N-diethyl carboxamido, etc.

Y (when $n=1$) may be any of the aforementioned alkenyl, hetero and substituted forms thereof and additionally may be aryl, and substituted forms thereof such as: phenyl, tolyl, xylyl, cumyl, α-naphthyl, β-naphthyl, α-anthraquinonyl, β-anthraquinonyl, γ-anthraquinonyl, phenanthranyl, diphenyl and the alkyl substituted derivatives thereof.

Substituted aryls, e.g., anisole, phenetole, p-diethoxyphenyl, 1-methoxy-phenanthryl, α-naphthylmethylether, β-naphthylmethylether, α-naphthylmethylether, β-naphthylethylether, hydroxyethyl phenyl, hydroxypropyl phenly, chlorophenyl, bromophenyl, 1,2-dichlorophenyl, 1,3-dichlorophenyl, 1,3,5-trichlorophenyl, 1,2-dibromophenyl, α-chlorotolyl, m-chlorotolyl, m-bromotolyl, bromo-o-oxylyl, α,β-dichloronaphthyl, 4-bromoacenaphthyl, carboxyphenyl, carboxytolyls, carbalkoxyphenyls, e.g., carbomethoxyphenyl, carboethoxyphenyl, carbalkoxytolyls, e.g., carbomethoxytolyls, acetophenyl, propiophenyl, butyrophenyl, lauroylphenyl, stearoylphenyl p-acetotolyl, o-acetotolyl, α - benzoylnaphthyl, β - benzoyl naphthyl, acetaminophenyl, acet-methylamino phenyl, o-acetoaminotolyl, p - acetoaminotolyl, α - acetoaminonaphthyl, β-acetoaminonaphthyl propio-aminophenyl, butyro-aminophenyl, o - propio-aminotolyl, p - propio-aminotolyl, o-butyroaminotolyl, p - butyroaminotolyl, o-lauroylaminotolyl, p-lauroylaminotolyl, o-stearoylaminotolyl, sulfamylphenyl, sulfamylnaphthyl.

Suitable bivalent bridging radicals for Y and $n=2$ include:

$-CH_2CH_2-$ $-CH_2CH_2CH_2-$ $-CH_2CH_2CH_2CH_2-$ $-CH_2CH_2CH_2CH_2CH_2-$

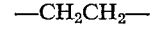

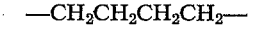

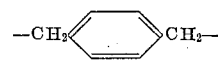

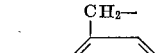

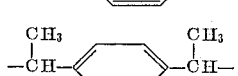

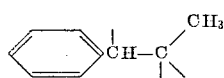

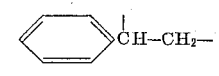

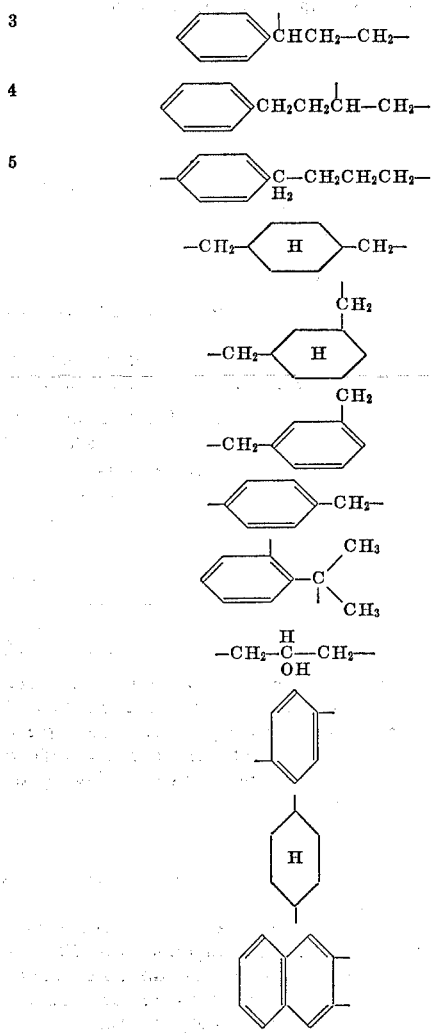

It is of course clear that other non-chromophoric substituents may be present in the above radicals, e.g., —CHClCHCl—
—CHBrCH₂CHBr—

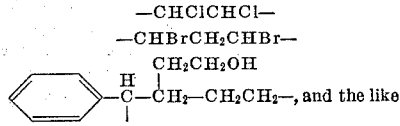

The general procedure for preparing the compounds of this invention involves a condensation of an aryl hetero ketone with a selected cyanomethylene ester preferably in the presence of an acidic catalyst.

Suitable ketones include the following:

bis(3,5-dimethyl-4-propyl-3-pyrryl) ketone
bis(5-bromo-4-ethyl-3-methyl-2-pyrryl) ketone
bis(3-ethyl-5-methyl-2-pyrryl) ketone
bis(4-ethyl-3-methyl-2-pyrryl) ketone
bis(5-ethyl-3-methyl-2-pyrryl) ketone
bis(5-bromo-2-thienyl) ketone
bis(5-methyl-2-thienyl) ketone
bis(5-chloro-2-thienyl) ketone
5-chloro-2-thienyl 5-bromo-2-thienyl ketone
(5-chloro-2-thienyl)-2-thienyl ketone
5-methyl-2-thienyl 5-bromo-2-thienyl ketone
5-methyl-2-thienyl 5-chloro-2-thienyl ketone
2,5-dimethyl-3-thienyl 5-chloro-2-thienyl ketone
5-chloro-2-thienyl 5-ethyl-2-thienyl ketone
2,5-dimethyl-3-thienyl 2-thienyl ketone
bis(5-methyl-2-thienyl) ketone
bis(2,5-dimethyl-3-thienyl) ketone
2-furyl 3-indolyl ketone
2-furyl 2-thienyl ketone
2-furyl ketone
3-thienyl ketone
2-furyl 2-methyl-3-indolyl ketone
2-furyl 1-methyl-3-indolyl ketone
3-indolyl 2-thienyl ketone
2-pyrryl 2-thienyl ketone
2,5-dimethyl-3-thienyl 2-thienyl ketone
2,5-dimethyl-3-thienyl 2-furyl ketone
2-pyridyl 4-pyridyl ketone
3-pyridyl 4-pyridyl ketone
5-chloro-2-thienyl 2-furyl ketone
5-chloro-2-thienyl 3-furyl ketone
3-indolyl 5-methyl-2-thienyl ketone
3-indolyl 2-pyridyl ketone
2-thienyl 3-thienyl ketone
2-thienyl 5-(2-thienyl)-2-thienyl ketone
2-thienyl 6-(2-thienyl)-3-pyridyl ketone
5-ethyl-2-thienyl 2-furyl ketone In addition to the above-contemplated derivatives, polyoxyalkylated derivatives thereof are within the purview of this invention. Any of the aforementioned compounds containing at least one reactive hydrogen atom may be reacted with an alkylene oxide or a compound functioning as an oxide (or mixtures thereof) such as: ethylene oxide, propylene oxide, butylene oxide, butylene dioxide, isobutylene oxide, glycidol, epichlorohydrin, butadiene dioxide, styrene oxide, and the like to yield the corresponding polyoxyalkylated products. Among the types of compounds which are reactive in this manner are: hydroxy compounds, amide compounds, carboxy compounds, etc. From one to about 200 mols of oxyalkylating agent may be condensed with the said reactive compounds.

The following examples will serve to illustrate the present invention without being deemed limitative thereof. Parts are by weight unless otherwise indicated.

Example 1

Preparation of allyl-α-cyano-β,β-bis(2-thienyl) acrylate.
Into a 500 ml. three-necked flask fitted with a stirrer, thermometer, Barrett-type water separator, reflux condenser, and heating mantle, are added:

| | |
|---|---|
| Bis(2-thienyl) ketone | mol__ 0.25 |
| Allyl-α-cyanoacetate | mol__ 0.25 |
| Ammonium acetate | g__ 3.5 |
| Glacial acetic acid | ml__ 20 |
| Benzene | ml__ 50 |

The reaction mixture is heated ot reflux and maintained thusly while adding 1 g. portions of catalyst each hour until no further water is evolved. The mixture is then steam-distilled and the solid isolated.

Example 2

Preparation of α-cyano-β,β-bis(2-thienyl) acrylic acid propenyl ester.
Example 1 is repeated, except that in place of the allyl ester, there is used the propenyl ester.

Example 3

Example 1 is repeated, employing the following ketones:
(a) bis-(3-thienyl) ketone
(b) 2 furyl ketone (bis)
(c) bis-(5-methyl-2-thienyl) ketone
(d) bis(5-chloro-2-thienyl) ketone
(e) 5-methyl-2-thienyl 5-bromo-2-thienyl ketone
(f) 2,5-dimethyl-3-thienyl 2-thienyl ketone
(g) 2-furyl 2-thienyl ketone
(h) 2-pyrryl 2-thienyl ketone
(i) 3-indolyl 2-pyridyl ketone
(j) 5-chloro-2-thienyl 3-furyl ketone

Example 4

Examples 1 and 3 are repeated, employing the following α-cyanoacrylic acid esters:

(a) isopropenyl-α-cyanoacetate
(b) crotyl-α-cyanoacetate
(c) decenyl-1-α-cyanoacetate
(d) phenyl-α-cyanoacetate
(e) tolyl-α-cyanoacetate
(f) o-chlorotolyl-α-cyanoacetate
(g) p-carboxyphenyl-α-cyanoacetate
(h) p-carboethoxyphenyl-α-cyanoacetate
(i) o-carbomethoxyphenyl-α-cyanoacetate
(j) p-stearoylphenyl-α-cyanoacetate
(k) tetrahydrofurfuryl-α-cyanoacetate
(l) α-pyridyl-α-cyanoacetate
(m) (4-chlorophenyl)-α-cyanoacrylate
(n) (4-methoxyphenyl)-α-cyanoacrylate
(o) naphthyl-α-cyanoacrylate
(p) p-quinolyl-α-cyanoacetate
(q) α-pyrimidinyl-α-cyanoacetate
(r) p-hydroxyphenyl-α-cyanoacetate
(s) p-sulfamylphenyl-α-cyanoacetate
(t) 4-pyrazolyl-α-cyanoacetate
(u) 4-methyl-2-thiazolyl-α-cyanoacetate
(v) p-acetamidophenyl-α-cyanoacetate
(w) p-benzamidophenyl-α-cyanoacetate
(x) p-benzoylphenyl-α-cyanoacetate
(y) p-carboiso-octoxyphenyl-α-cyanoacetate In the preparation of many esters of the present invention and in particular the aryl esters, e.g., phenyl, substituted phenyl, naphthyl, and the like which require the corresponding cyanoacetate ester, there may be a tendency for the latter to undergo hydrolysis in the above-described type of condensation reaction. In order, therefore, in these cases, to achieve an optimum yield, it may be desirable to prepare the ethyl ester or other lower alkyl ester and transform this ester into the aryl ester by transesterification with an excess of the corresponding phenol. A solvent may or may not be employed depending on the physical state of the mixture of alkyl ester and phenol. Usually, since these are solids, it is preferred to use an organic solvent such as benzene, toluene or xylene. By virtue of the transesterification technique, the alkanol is produced, which is stripped off, and the solvent may then also be removed in any suitable manner, as, for example, by distillation. In the transesterification reaction it is also preferred to use a small amount (0.1% to about 2% by weight based on the weight of reactants) of a strong base, e.g., caustic soda, alkali carbonate, toluenesulfonamide sodium salt, and the like.

Example 5

The products of Examples 4(r) and 4(s) are oxyalkylated with ethylene oxide in an autoclave at 80° C. in the presence of 1.3% KOH. Varying amounts of oxide are used, as indicated below:

| | Compound of Example | Mols E.O.[1] |
|---|---|---|
| (a) | 1-4(r)[2] | 6 |
| (b) | 1-4(r) | 10 |
| (c) | 1-4(r) | 20 |
| (d) | 1-4(s) | 6 |
| (e) | 1-4(s) | 12 |
| (f) | 1-4(s) | 50 |

[1] E.O.=ethylene oxide.
[2] Condensation product of ketone of Example 1 with indicated cyanoacetate.

The compounds derived from the 4(r) compound have the formula:

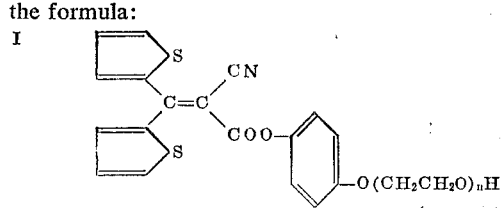

and from the 4(s) compound, have the formula:

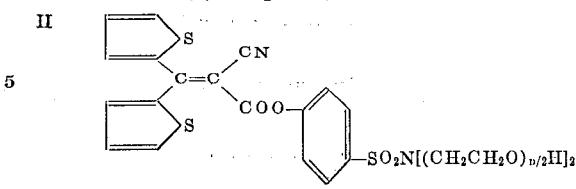

$n$=mols of ethylene oxide.

Example 6

The product of Example 1 is used in a nitrocellulose lacquer as follows:

A mixture of 20 parts of Solution I and 80 parts of Solution II is prepared wherein Solution I consists of:

| | |
|---|---|
| Nitrocellulose _____Parts ½ sec__ | 46 |
| Product of Example 1 _____parts__ | 4 |
| Cellolyn 502 (non-drying plasticizing alkyd resin of Hercules Powder Co.) _____parts__ | 35 |
| Dibutyl phthalate _____do____ | 15 |

Solution II consists of:

| | Parts |
|---|---|
| Butyl acetate | 35 |
| Butanol | 15 |
| Toluene | 50 |

The resulting lacquer solution is drawn out on a metal plate with a Bird film applicator to give a 2 mil film. A similar film is prepared without the product of Example 1. Upon exposure to ultraviolet light, the latter film yellows and deteriorates before any visible signs of yellowing are observed in the protected film.

Example 7

The product of Example 3(c) is incorporated into a synthetic latex as follows:

A 50% dispersion of the absorber of Example 3(c) is made by kneading 20 g. of the compound with 20 g. of formaldehydenaphthalene - 2 - sodium sulfonate (Tamol NNO) in a Werner-Pfleiderer mixer for several hours in the presence of sufficient water to keep the material in a viscous state. The material is then evaporated to dryness to give the dispersed form of the absorber. The dispersed absorber is then incorporated into an acrylonitrilebutadiene latex (Chemigum 247) employing 5% of the absorber based on the weight of the latex. The latex is then sprayed onto leather. The film prepared in this manner shows less tendency to yellow on exposure to light than a similar film prepared in the same manner, but omitting the ultraviolet absorber.

Example 8

The product of Example 3(d) is prepared as a 3% solution in Methyl Cellosolve and a sponge of polyvinyl chloride foam is impregnated therewith. The foam is prepared from the following formulation:

| | Parts |
|---|---|
| Marvinol VR–10 (polyvinyl chloride resin-U.S. Rubber) | 100 |
| Di-2-ethylhexylphthalate | 130 |
| Barium cadmium stabilizer (Advance BS–105) | 3.5 |
| Celogen (p,p'-oxybis(benzenesulfonyl hydrazide)) | 35 |
| | 258.5 |

The sponge is squeezed free of solvent and dried. It is much more stable to ultraviolet light than untreated material.

Example 9

The products of Examples 1, 3(b), 1-4(c), and 1-4(j), are incorporated into polyethylene by melting at 130° C. a mixture of 99.5 g. of polyethylene wax P.T. 95504 (Semet-Solvay) and 0.5 g. of absorber. The mixture is then pressed out in a Carver press to give a film of about 0.3 in. thick. Excellent stability to ultraviolet light is exhibited by the films. The latter also afford protection to food and the like packaged therein.

Example 10

Compounds 1–4($r$) and 1–4($s$) are oxypropylated with 10 mols of propylene oxide in the manner of Example 5, and then oxyethylated with 12 mols of ethylene oxide.

Example 11

The product of Example 5($c$) is used in formulating a liquid detergent as follows:

| | |
|---|---|
| Nonylphenol+10 ethylene oxide condensate | 8 |
| Tetrapotassium pyrophosphate | 26 |
| Sodium silicate | 4 |
| Low viscosity carboxymethyl cellulose | 0.4 |
| KOH | 2 |
| Water | 57.6 |
| Product of 5($c$) | 2 |

Excellent stability to ultraviolet light after 100 hours exposure is obtained.

Example 12

The product of Example 5($b$) is used to impregnate dyed cotton. The bath contains 3 g./100 ml. water. Excellent protection against ultraviolet light degradation is obtained.

Example 13

Example 1 is repeated, employing 0.5 m. of the following cyanoacetates in lieu of 0.25 m. of the allyl compound of Example 1:

(a) glyceryl-1,3-bis($\alpha$-cyanoacetate)
(b) propylene-3-bis($\alpha$-cyanoacetate)(bis-cyanoacetyl-1,3-propanediol)
(c) butylene-1,4-bis($\alpha$-cyanoacetate)(bis-cyanoacetyl-1,4-butanediol)
(d) bis-cyanoacetyl-4,4'-dihydroxybenezne
(e) bis-cyanoacetyl-o-cyclohexylenediol
(f) bis-cyanoacetyl-p-xylylene glycol
(g) bis-cyanoacetyl-2,5-dimethylhydroquinone

Example 14

A 10 gm. swatch of Dacron (ethylene glycol terephthalic acid polyester) cloth is heated in an aqueous bath of 0.4 gms. of the compound of Example 1 dispersed in 300 mls. of water at 190° F. for 1 hour. The dispersion is prepared by adding to the 190° F. water while stirring vigorously, a solution of the acrylamide in 5 ml. of ethanol. The dried swatch is compared with an untreated sample after both are exposed to ultraviolet light in a fadeometer. After 100 hours, the untreated swatch shows a distinct yellow coloration, whereas the treated sample is unchanged.

Example 15

Example 14 is repeated, using the following compounds:

(a) Example 2
(b) Example 3($a$)
(c) Example 3($d$)
(d) Example 3($e$)
(e) Example 3($h$)
(f) Example 1–4($d$)
(g) Example 1–4($g$)
(h) Example 1–4($l$)

The results are similar to those of Example 14.

Example 16

Examples 14 and 15 are repeated, using acrylic textile materials as follows:

(a) films of homopolyacrylonitrile
(b) films of copolymer (90 acrylonitrile, 10% vinyl pyridine)
(c) films of polymer mixture (95% polyacrylonitrile, 5% polyvinylpyrrolidone)

Excellent stabilization is achieved in each instance.

Example 17

To 100 gms. of powdered nylon 66 (polyhexamethylene adapamide) are added 1 g. of the absorber of Example 1. After thorough mixing, the mixture is extruded into fibers from a hot melt. A cloth is woven from said fibers and compared with a similar fabric without absorber in the manner of Example 11. The fabric containing the arbsorber exhibits superior ultraviolet light stability.

Example 18

Example 17 is repeated using the following polymers:
(a) Dacron
(b) polyethylene
(c) polypropylene
(d) cellulose acetate (2.5 acetyl value)
(e) polyvinylidene chloride

Example 19

Examples 17 and 18 are repeated, using the absorbers of Examples 13 $a$–$g$.

The compounds of this invention are soluble in many diverse types of polymers, resins, waxes and the like, and therefore they are particularly suitable and adaptable for the stabilization of such materials as exemplified above. The non-oxyalkylated products are insoluble in water. Those compounds which contain lesser amounts of oxyalkyl groups, that is, up to about 4–6 groups per molecule, are in general less soluble in the non-polar solvents, but are readily dispersible in water. The compounds containing larger amounts of alkylene oxide, that is, above about 6 mols thereof per mol of base compound, range from soluble in water with the solubility increasing as the number of oxyalkylene groups increases.

The ultraviolet absorbing compounds of the present invention may be used to stabilize all organic materials which are susceptible to ultraviolet degradation and are particularly useful in the stabilization of resins and plastics, whether they be in the form of films or molded products and either clear, opaque, semi-opaque or translucent. Foam, plastics and fibers are also admirably stabilized by these compounds. Pigments, polishes, creams, lotions, paints, enamels, varnish films, and dyestuffs, when susceptible to ultraviolet degradation, have been found to be excellently stabilized by the compounds of the present invention. The amount of stabilizer to be incorporated in such compositions is not critical except that sufficient should be present to effect an acceptable degree of stabilization and no more should be used than is necessary to obtain such results. In general, between about 0.1% and 10% by weight, based upon the organic solids weight to be stabilized, may be used.

Other variations in and modifications of the described processes which will be obvious to those skilled in the art can be made in this invention without departing from the scope or spirit thereof.

What is claimed is:
1. An essentially colorless compound exhibiting a prominent absorption peak between 2500 A. and 4000 A. of the formula:

$$\left[ \begin{array}{c} (HET) \\ \\ (HET) \end{array} \diagdown C=C \diagup \begin{array}{c} CN \\ \\ C-O \\ \| \\ O \end{array} \right]_n Y$$

wherein
(a) each (HET) represents, independently, a heterocyclic nucleus containing at least one pair of conjugated double bonds selected from the group consisting of 5- and 6-membered monocyclic heterocycles containing as the hetero atom at least one member selected from the group consisting of oxygen, nitrogen and sulfur, and the corresponding benzo monocyclic heterocycles, said nucleus being devoid of nitro and nuclear bonded amino groups,
(b) $n$ is an integer from 1 to 2, and
(c) when $n=1$, Y is a radical selected from the group consisting of $C_3$–$C_{25}$ alkenyl, phenyl, naphthyl, the lower alkyl, lower alkoxy halo, carboxy, carboxamide, lower carbalkoxy, lower alkanoyl, benzoyl, alkanoylamino of up to $C_{18}$ and sulfamyl derivatives of said phenyl and naphthyl and (HET) radicals and
(d) when $n=2$, Y is a bivalent radical selected from the group consisting of lower alkylene, arylene of up to 10 carbon atoms, cyclohexylene 2-hydroxy propylene and chloro and bromo substituted lower alkylene.

2. A compound as defined in claim 1 wherein each (HET) is monocyclic sulfur-containing.
3. A compound as defined in claim 1 wherein each (HET) is nitrogen-containing.
4. A compound as defined in claim 1 wherein each (HET) is oxygen-containing.
5. A compound as defined in claim 2 wherein each (HET) is thienyl.
6. A compound as defined in claim 1 wherein one (HET) is thienyl and the other (HET) is furyl.
7. A compound as defined in claim 2 wherein each (HET) is furyl.
8. A compound as defined in claim 1 wherein $n=1$.
9. A compound as defined in claim 1 wherein $n=2$.
10. A compound as defined in claim 8 wherein Y is $C_3$–$C_{25}$ alkenyl.
11. A compound as defined in claim 8 wherein Y is phenyl.
12. A compound as defined in claim 8 wherein Y is (HET).
13. A compound as defined in claim 9 wherein Y is lower alkylene.
14. A compound as defined in claim 9 wherein Y is phenylene.
15. The compound as defined in claim 1 wherein
 (a) each (HET) is 2-thienyl,
 (b) $n$ is 1, and
 (c) Y is allyl.
16. A compound as defined in claim 1 wherein
 (a) each (HET) is 2-thienyl,
 (b) $n$ is 1, and
 (c) Y is phenyl.
17. A compound as defined in claim 1 wherein
 (a) each (HET) is 2-thienyl
 (b) $n$ is 1, and
 (c) Y is p-stearoylphenyl.
18. A compound as defined in claim 1 wherein
 (a) each (HET) is 2-thienyl
 (b) $n=2$, and
 (c) Y is tetramethylene.

References Cited
UNITED STATES PATENTS

| | | | |
|---|---|---|---|
| 2,978,462 | 4/1961 | Berman et al. | 260—345.2 |
| 3,022,318 | 2/1962 | Berman et al. | 260—345.2 |
| 3,072,481 | 1/1963 | Berman et al. | 96—48 |
| 3,085,469 | 4/1963 | Carlson | 88—24 |

HENRY R. JILES, *Primary Examiner.*

C. M. SHURKO, *Assistant Examiner.*